United States Patent [19]

Goff, III

[11] Patent Number: 4,905,780

[45] Date of Patent: Mar. 6, 1990

[54] TRANSPORTABLE LIVESTOCK SCALE

[76] Inventor: Ben D. Goff, III, Holmhurst Farm, 2985 Van Meter Rd., Winchester, Ky. 40391

[21] Appl. No.: 346,967

[22] Filed: May 3, 1989

[51] Int. Cl.[4] ............... G01G 19/08; G01G 19/02; G01G 23/02

[52] U.S. Cl. ........................... 177/136; 177/146; 177/156

[58] Field of Search ................. 177/136, 146, 156

[56] References Cited

U.S. PATENT DOCUMENTS

| | | | |
|---|---|---|---|
| 4,359,099 | 11/1982 | Henslin | 177/140 |
| 4,427,083 | 1/1984 | Muddle | 177/132 |
| 4,470,471 | 9/1984 | Mills | 177/132 |
| 4,533,008 | 8/1985 | Ostermann | 177/132 |
| 4,569,408 | 2/1986 | Berns et al. | 177/132 X |
| 4,850,441 | 7/1989 | Mosdal | 177/136 |

Primary Examiner—George H. Miller, Jr.
Attorney, Agent, or Firm—William C. Crutcher

[57] ABSTRACT

A transportable livestock scale has a towable trailer bed with load cells mounted on the trailer bed in the four corners and a weighing cage having a platform arranged to rest on the load cells. The cage side members have gates for entry or exit of livestock, and loading ramps arranged to be transported on the trailer bed in a storage position when traveling. During weighing extendable support legs connected to the trailer bed partially support the trailer bed, and temporary spacer blocks are removed which support the weighing platform directly from the trailer bed and protect the load cells during travel.

13 Claims, 5 Drawing Sheets

TRANSPORTABLE LIVESTOCK SCALE

BACKGROUND OF THE INVENTION

This invention relates generally to scales for weighing animals and more particularly relates to a transportable livestock scale which may be transported over the highway and converted to a weighing platform at the site where livestock are located.

There has been a need by farmers for an accurate scale for weighing livestock which can be transported from one farm to another so that livestock can be weighed in familiar surroundings. The price received by the farmer for his livestock depends upon the weight of the animals. In the past, the customary procedure is to load the animals into a truck and transport them to a stationary weighing station. Since many types of livestock are excitable creatures, the process of rounding them up, loading them out of the truck, traveling to the weighing station, removing them and weighing them in unfamiliar surroundings, causes them to lose weight through excessive urination and defecation. As much as 5 to 8% of animal weight can be lost in this weighing process, which is an economic loss to the farmer selling the livestock.

There is a need for a way to bring the weighing platform to the animals rather than to bring the animals to the weighing platform. At the same time, conditions for obtaining accurate weights in the farmer's fields are not good, due to varying and rough terrain. There is a need for quickly setting up and establishing an accurate livestock scale in different types of locations and arranging for weighing several animals at a time in order to shorten the weighing process. Convenience of moving livestock on and off the scales in the shortest time is of primary importance.

Transportable livestock scales have been suggested in the prior art, usually of a small size for weighing one animal at a time. Such a scale is shown in U.S. Pat. No. 3,074,497-Hawbaker, which shows a livestock weighing cage hanging on a balance scale within a supporting frame. The frame has towing handles on one end and retractable wheels on the other. Another transportable livestock scale is shown in U.S. Pat. No. 4,533,008-Ostermann, comprising a cage supported by a frame mounted on wheels and employing a balance lever scale. The Hawbaker and Ostermann scales are lightweight devices suitable only for small animals, or at most, one large animal.

Other types of transportable livestock scales are known which may be disassembled, transported, and re-assembled, such as the scale shown in U.S. Pat. No. 3,774,704-Purcell.

Stationary livestock weighing scales are known which use electrical load cells incorporating strain gages in the place of balance levers. Such a scale is shown in U.S. Pat. No. 4,427,083-Muddle which further incorporates adjustable feet for the weighing platform to support the platform. Another type of electronic livestock weighing system is commercially available as a stationary scale comprising load cells in "load bars" which are designed to be placed under decks and platforms for various weighing applications, including group livestock weighing crates. Such systems are marketed as Tru-Test/Snell platform scales by Snell Marketing, Inc. and require assembly with the decks or platforms.

Accordingly, one object of the present invention is to provide an improved transportable livestock scale, which may be easily moved from one location to another and set-up to accurately weigh animals in groups.

Another object of the invention is to provide an improved transportable livestock scale which is simple to operate and adaptable to various types of weighing conditions.

Another object of the invention is to provide an improved livestock scale which is convenient for moving livestock on and off the scales quickly.

SUMMARY OF THE INVENTION

Briefly stated, the invention is practiced by providing a trailer bed with wheels and draft attachment for pulling the trailer bed, a plurality of load cells mounted on the trailer bed in spaced relationship, a weighing cage having a platform arranged to rest on the load cells and having cage side members together defining an enclosure for livestock to be weighed, the cage side members having at least one gate for entry or exit of livestock, a plurality of extendable support legs connected to the trailer bed and having means to extend the legs to at least partially support the trailer bed, and load cell protective means for supporting the weighing platform directly from the trailer bed and unloading the load cells during travel. In its preferred form, the transportable livestock scale includes one or more loading ramps arranged to be transported on the trailer bed in a storage position when traveling, and wherein the trailer bed includes support brackets for supporting one end of a ramp adjacent the gate during weighing of livestock.

DRAWING

The invention, both as to organization and method of practice, together with further objects and advantages thereof, will best be understood by reference to the following specification, taken in connection with the accompanying drawings, in which;

FIG. 1 is a top plan view of a preferred form of the improved transportable livestock scale during transportation of the scale, FIG. 2 is a side elevational view of FIG. 1, FIG. 3 is a top plan view of the FIG. 1 livestock scale arranged for loading and weighing livestock, FIG. 4 is a side elevational view of FIG. 3, FIG. 5 is a perspective view of one corner of the transportable livestock scale showing ramp support and extendible support leg details, FIG. 6 and FIG. 7 are front elevation view and side cross-sectional elevation view (along lines VII—VII of FIG. 6) respectively of portions of the scale with a typical load cell and load cell transportation protection device, FIG. 8 and FIG. 9 are top plan view and side elevational view respectively of a modified form of the transportable livestock scale during transportation thereof, and FIG. 10 and FIG. 11 are top plan view and side elevational view respectively of the modification shown in FIG. 8 and FIG. 9, but arranged for loading and weighing livestock.

DESCRIPTION OF THE PREFERRED EMBODIMENT

Figure 1:
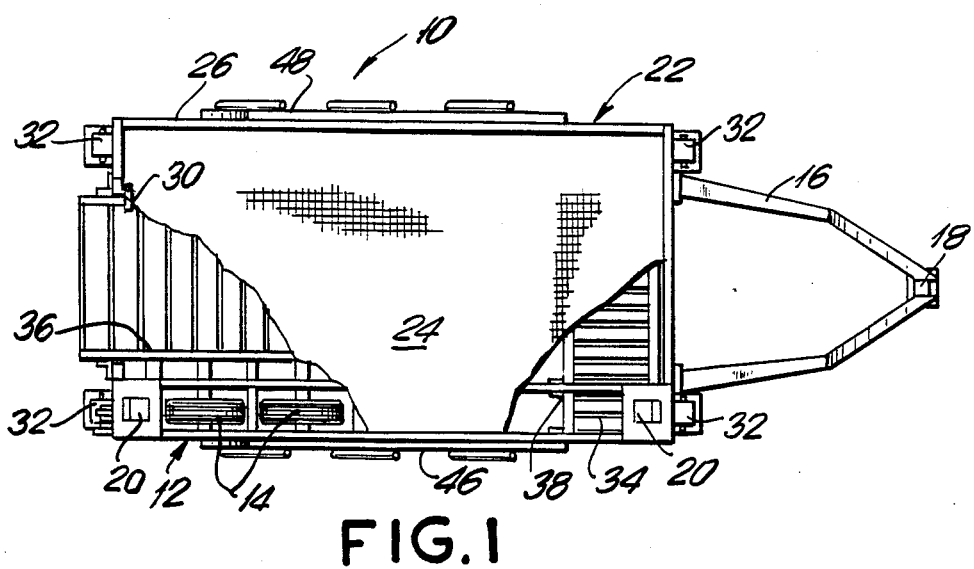

Referring now to FIG. 1 of the drawing, a transportable livestock scale shown generally at 10 includes a trailer bed 12 made up of steel structural members as a rectangular frame, and having wheels 114 mounted on conventional springs and axle, a draft attachment consisting of a "goose-neck" arm 16 and a hitch 18 for connecting to the center bed of a truck or to the "fifth wheel" of a tractor. Disposed on steel plates in each of the four corners of the trailer bed 12 are four load cells 20, only two of these being shown in FIG. 1. Arranged on top of the trailer bed is a rectangular weighing cage 22, which is a separate fabricated structure of structural steel comprising a horizontal platform 24 and cage side members 26. The cage side members 26 together define an enclosure for the livestock to be weighed. A sliding front gate 28 (FIG. 2) and a hinged double rear gate 30 (partially shown in FIG. 1) are included on supports on the cage side members near the front and rear respectively of the trailer bed to provide for easy entry and departure of livestock to and from the enclosure.

In each of the four corners of the livestock scale, extendable support legs 32 are securely attached to the trailer bed by welding to the horizontal structural steel members making up trailer bed 12. The extendable legs 32 are retracted to the position shown in FIG. 2 during travel of the transportable livestock scale.

In order to provide access to the weighing platform and entry or departure of livestock through gates 28, 30, a pair of loading ramps are carried by supports beneath the trailer bed 12. These consist of a transversely mounted front ramp 34 and a longitudinally mounted rear ramp 36, which are supported in brackets 38, 40 respectively. Brackets 38, 40 are constructed so that the ramps 34, 36 can be slid from beneath the trailer bed and connected to the trailer bed for loading, using mounting brackets on the trailer bed shown at 42, 44 respectively. The use of a "gooseneck" draft attachment is particularly advantageous since it provides stowage space for front ramp 34 to extend laterally across the trailer bed. The ramps 34, 36 have side enclosures, such as 46 and 48 respectively, which are hooked onto the cage side members 26 and carried to the weighing site for assembly.

Figure 2:
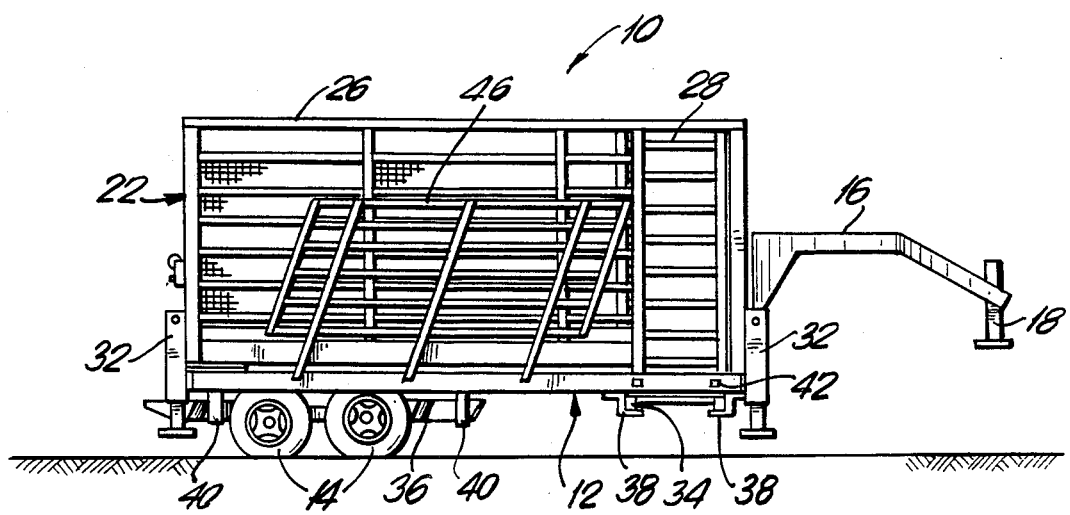
Figure 3:
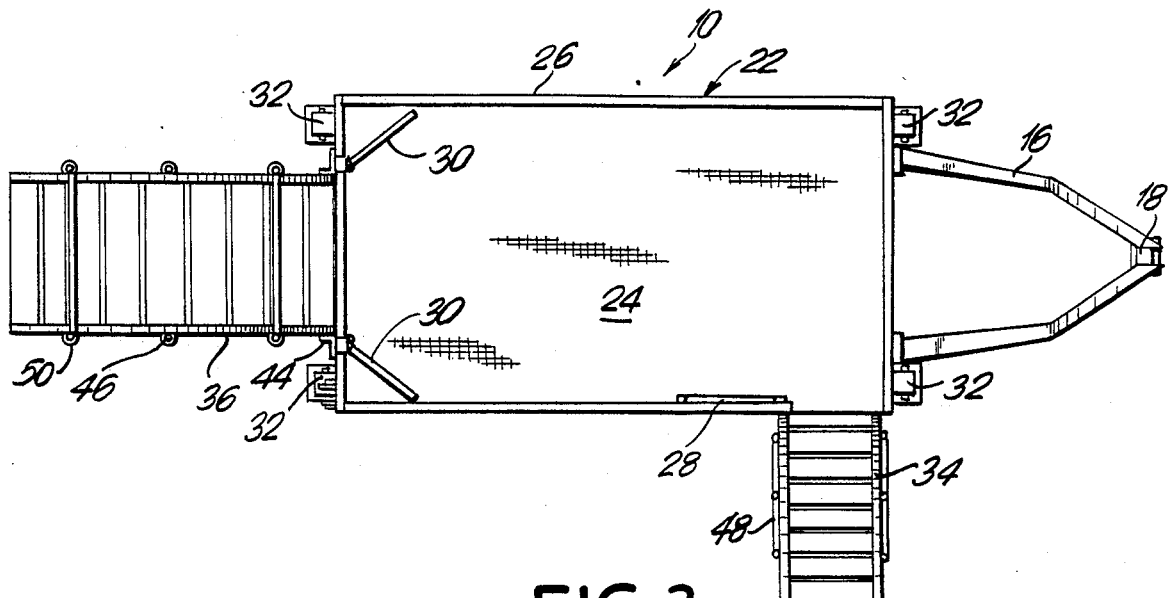
Figure 4:
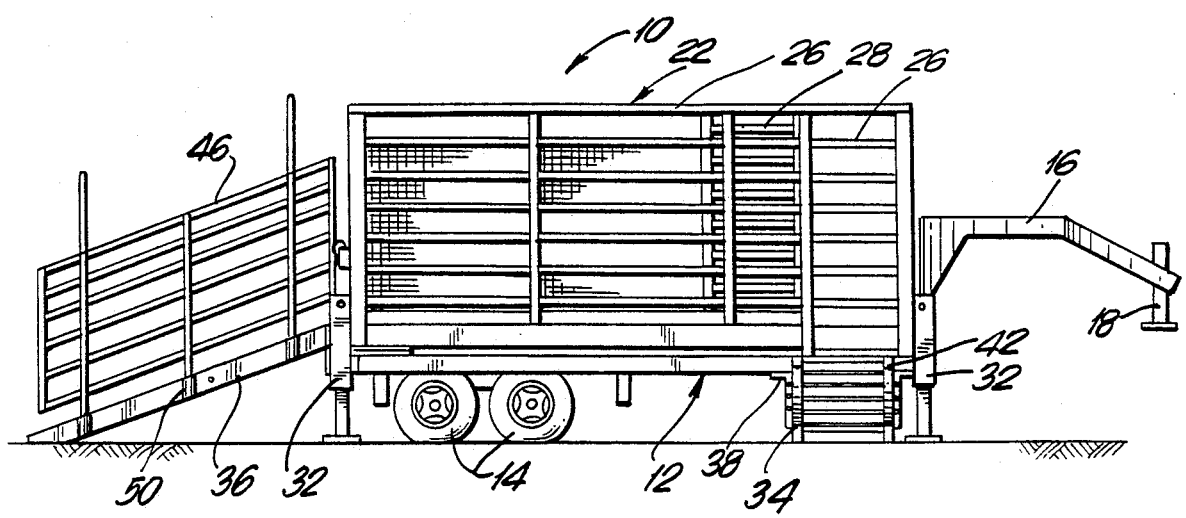

Referring to FIGS. 3 and 4 of the drawing, the same elements are shown as discussed in connection with FIGS. 1 and 2, except that the transportable livestock scale 10 has been set-up for weighing livestock. Front and rear ramps 34, 36 are shown removed from the carrying brackets 38, 40 and positioned adjacent the respective gates 28, 30. One end of front ramp 34 is supported by brackets 42 on trailer bed 12. The other end either rests on the ground or may be raised to rest on a truck bed. One end of ramp 36 is similarly supported in brackets 44 attached to the trailer bed, while the other end rests on the ground. The side enclosures 46, 48 are shown removed from the side of the cage side members and inserted into pipe supports 50 on the ramps.

Extendable support legs 32 are shown with their foot pads resting on the ground. Load cells 20 are now arranged to support the weighing cage 22, as will be clear by referring to the following detailed description.

Figure 5:
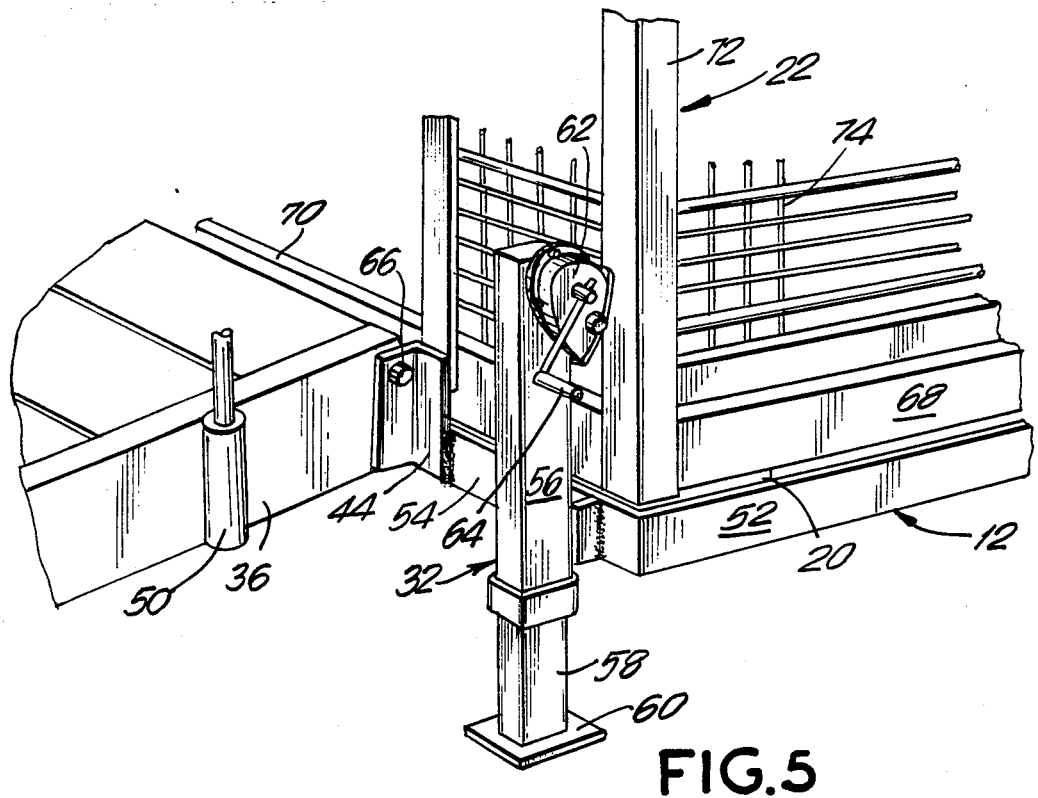

Referring to FIG. 5, a perspective view is shown of one corner of the transportable livestock scale giving construction details which are typical of the other three (3) corners. The trailer bed 12 includes a longitudinal channel 52 and a transverse channel 54 welded together. To channel 54 is welded an extendable support leg 32 comprising a casing 56, extendable leg 58 and foot pad 60. The upper end of extendable leg 58 inside casing 56 is threaded so that leg 58 maybe manually cranked up and down by means of a gear box 62 and a crank 64. A suitable extendable support leg is commercially available as a device used to support the end of a trailer after the tractor has been removed.

The support for one end of the rear ramp 36 consists of a pair of brackets 44 which are attached by welding to the transverse channel 54 and provided with insertable hinge pins 66, which allows the ramp to pivot to change its angle of inclination.

Portions of the weighing cage are shown consisting of longitudinal members 68, transverse members 70, vertical members 72 and suitable cage mesh or bars 74. Note that the weighing cage is supported only on the load cells 20 and is not subject to extraneous forces from the loading ramp 36 or the extendable support leg 32, these being only connected to the trailer bed 12.

Figures 6, 7:
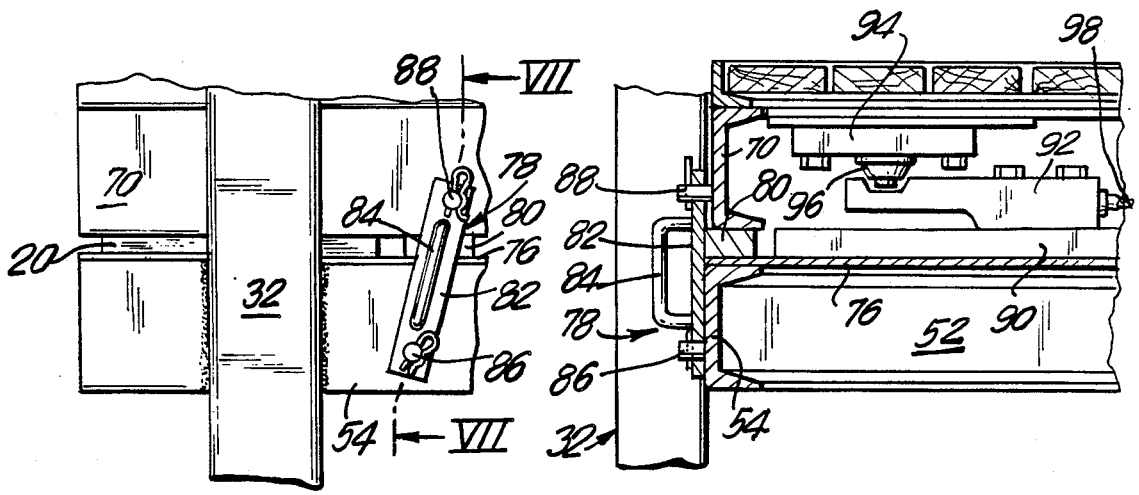

Referring to FIGS. 6 and 7, further details are shown of a typical load cell and load cell protective means at a typical corner of the scale. Referring to FIG. 6, an extendable support leg 32 is shown welded to a transverse channel 54 of the trailer bed. Above it, disposed just above load cell 20, is a transverse channel member 70 of the weighing cage. Load cell 20 rests upon and is secured to a plate 76 welded on top of the trailer bed at the corner. A special load cell protective device 78 provides means to unload and protect the load cell during transportation of the livestock scale. As seen in FIGS. 6 and 7, the protective device 78 comprises a removable spacer block 80 attached to an exterior plate 82 and having a handle 84. A pair of pins 86, 88 are attached to the respective transverse channels 54, 70 and secured with cotter pins, so as to temporarily retain the spacer block 80 in position during transport. The weighing cage is directly supported on the trailer bed by spacer blocks 80 during transportation. (Other side retaining members (not shown) may be used to provide restraint against the possibility of lateral shifting of weighing cage on the trailer bed during transport.)

To remove the protective device 78, a crow bar is inserted between the channels 54, 70 with the cotter pins removed, and spacer block 80 is removed using the handle 84.

Referring to FIG. 7 of the drawing, a typical load cell is shown, the details of which are not material to the present invention. A similar load cell is commercially available from Masstron Scale, Inc., known as a Flexmount (registered trademark) Weigh Module. Briefly, a support plate 90 has a cantilevered flexure member 92 with internal strain gage to measure the deflection, and a load bearing plate 94 carrying a load pin 96. The strain gage is connected by a cable 98, together with three (3) other load cells to digital electronic instrumentation and a digital display monitor to provide a weight reading. The details of the electronics are not material to the present invention and are well known in the art.

As shown in FIG. 7, load pin 96 is raised and separated from contact with the flexure member 92 when the spacer block 80 is in the position shown for transporting the scale, so that the load cell is unloaded and protected.

MODIFICATION

FIGS. 8, 9, 10 and 11 illustrate a modified form of the invention with respect to the arrangement of ramps and loading gates. The modified transportable livestock scale indicated generally by reference numeral 110 includes a trailer bed 112 mounted on wheels 114 and having a draft attachment comprising a tongue 116 and hitch 118. Load cells 120 are located in each of the four corners of trailer bed 112 as before, only one of these being shown in FIG. 8. A weighing cage, shown generally as 122 is made up of a rectangular platform 124 and cage side members 126 forming an enclosure for livestock to be weighed. A double front gate 128 comprises a pair of hinged gate-halves opening in the front cage side member and a vertically slidable rear gate 130 is supported in the rear cage side member. Extendable support legs 132 are attached at all four corners of the trailer bed as before. A front ramp 134 is pivotally attached to the trailer bed and shown pivoted to a storage position for travelling in FIGS. 8 and 9, while it is shown in a position for loading livestock in FIGS. 10 and 11. Similarly, a rear ramp 136 is attached to the trailer bed by hinge brackets (as in FIG. 5). Ramp 136 is shown in raised position for travelling in FIGS. 8 and 9, while it is shown in lowered position for loading livestock in FIGS. 10 and 11 with one end resting on the ground.

Figure 9:
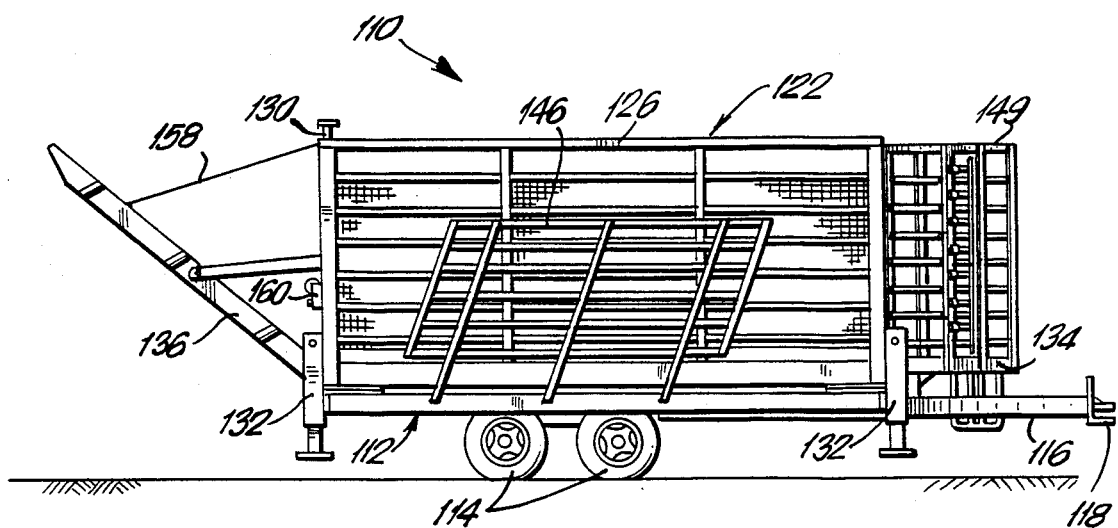
Figure 10:
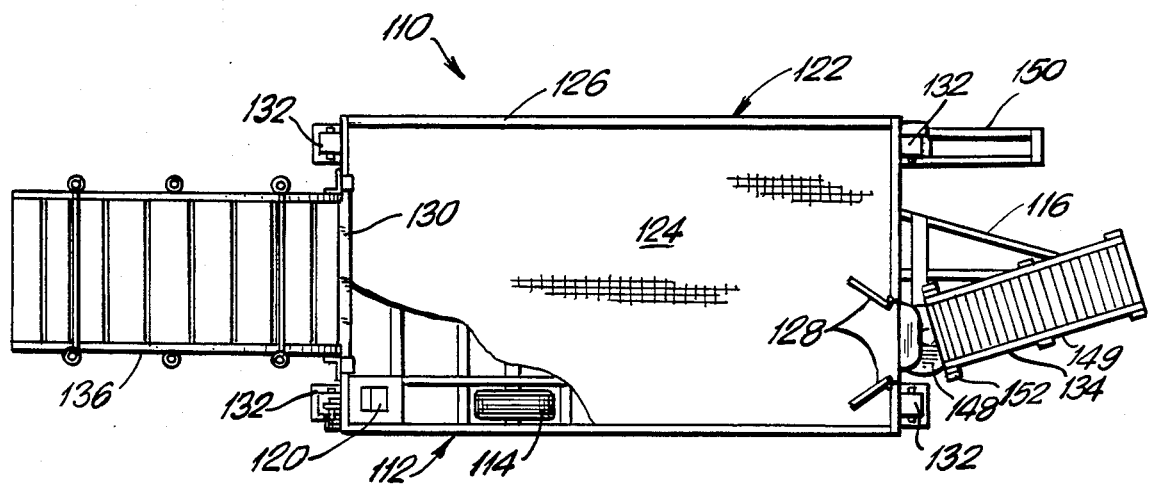
Figure 11:
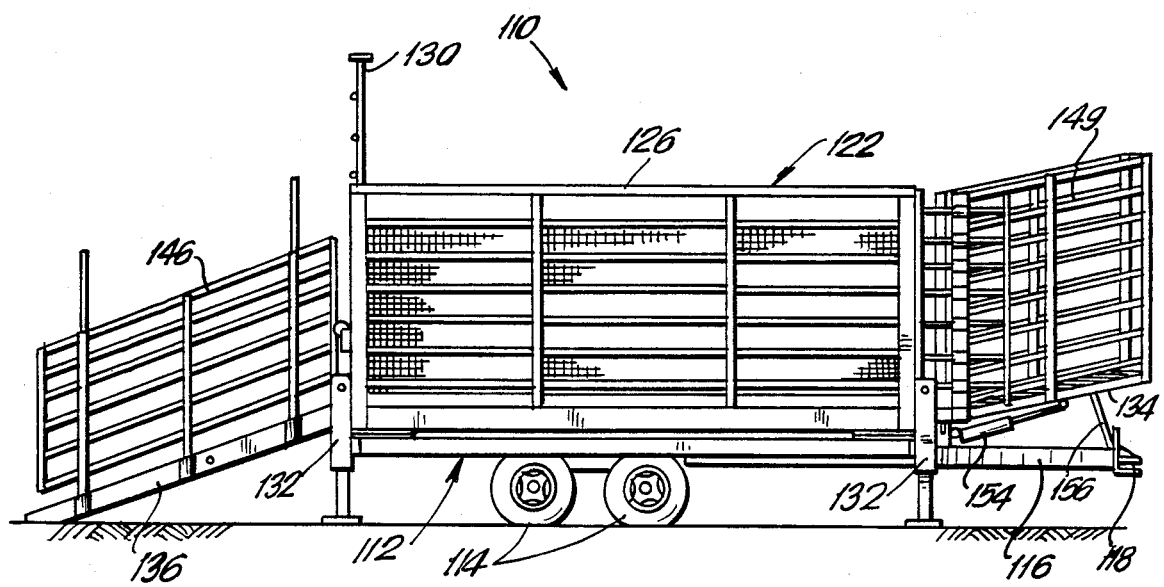

Detachable side enclosures 146 are shown in FIG. 9 as hooked to the cage side walls 126 for travelling, and in FIG. 11 as assembled to ramp 136 for loading.

Figure 8:
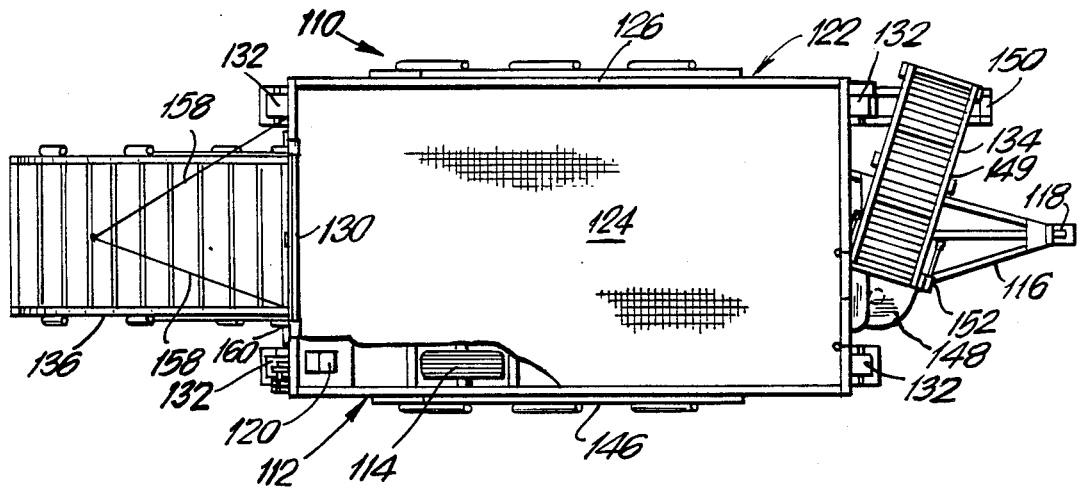

The major differences in the modification of FIGS. 8–11 are the arrangement of the front and year gates 128, 130 and the means of stowing the ramps 134, 136 for travel. Ramp 134 is mounted on a vertical swivel plate 148 so that it may pivot in a horizontal plane. A special holding bracket 150 extends from the trailer bed to support the free end of ramp 134, as shown in FIG. 8. Ramp 34 is also hinged at 152 to allow it to pivot up and down to change the incline in a vertical direction. As indicated in FIG. 11, a hydraulic cylinder 154 is provided to assist the vertical elevating movement. A support bar 156 provided for holding ramp 134 in an elevated position. Side enclosure members 149 are permanently attached to ramp 134.

Rear ramp 136 has hoist cables 158 with a system of pulleys (not shown) and a small winch 160 may be provided to hoist the ramp 136 to the travel position shown in FIG. 9 and to lower it to loading position shown in FIG. 11.

The only remaining difference to note is that the rear gate 130 slides up and down. Gate 130 is either lowered (FIG. 9) for travel or may be vertically raised (FIG. 11) to admit or discharge livestock between the weighing cage and ramp 136.

OPERATION

The operation of my improved transportable livestock scale, both in the preferred form of FIGS. 1–4 and in the modified version shown in FIGS. 8–11, is essentially the same. Highway transportation of the scale is enabled when the ramps are stowed for travel in first positions as in FIGS. 1 and 2, or as in FIGS. 8 and 9. The extendable support legs are retracted and the load cell protective device in FIGS. 6 and 7 is installed as shown. This protects the load cells during transportation to the weighing site.

At the weighing site, the four legs are extended by manual cranking as shown in FIG. 5 to support and level the trailer bed. The front and rear ramps are unstowed and lowered to the ground or elevated, as the case may be, to second positions for the desired type of livestock handling (as in FIGS. 3 and 4, or in FIGS. 10 and 11). While the rear ramp will normally rest on the ground, the front ramp may either rest on the ground or may be elevated to the level of a truck bed. The load cells are loaded by removing the cotter pins and protective devices 78 are removed using a crow bar to separate the trailer bed and weighing cage. When the protective devices are removed, the weighing cage is resting on the load cells and the electronic digital instrumentation used to average, and sum the weight sensed by the load cells. Accurate readings are possible, since the weighing cage is independent of ramps or other influences.

While there has been described what is considered to be preferred embodiment of the invention, other modifications will occur to those skilled in the art, and it is intended to cover in the appended claims all such modifications as fall within the true spirit and scope of the invention.

I claim:

1. A transportable livestock scale, comprising a trailer bed having wheels and having a draft attachment connected thereto for pulling the trailer bed,
   a plurality of load cells mounted on said trailer bed in spaced relationship,
   a weighing cage having a platform arranged to rest on said load cells and having cage side members together defining an enclosure for livestock to be weighed, said cage side members including at least one gate for entry or departure of livestock,
   a plurality of extendable support legs connected to said trailer bed and having means for extending said legs to unweight said wheels and at least partially support said trailer bed, and
   load cell protective means for selectively unloading said load cells and selectively supporting said weighing cage directly from said trailer bed during transportation thereof.

2. The transportable livestock scale according to claim 1, and further including at least one ramp arranged to be stowed on said scale in a first position during transportation thereof, said trailer bed having support brackets adapted to support one end of a said ramp in a second position adjacent said gate when the extendable support legs are extended and when said weighing cage is resting on said load cells, whereby livestock may travel on said ramp through said gate into or out of said enclosure for weighing.

3. The transportable livestock scale according to claim 2, and having a front gate near the front of said trailer bed and a rear gate near the rear of said trailer bed, and further having front and rear ramps adapted for said front and rear gates.

4. The transportable livestock scale according to claim 2, wherein said ramp is adapted to pivot in a vertical plane on said support brackets to change its angle of inclination.

5. The transportable livestock scale according to claim 4, wherein said ramp is further adapted to pivot in a horizonal plane.

6. The transportable livestock scale according to claim 1, wherein said load cell protective means comprises a spacer block adjacent each load cell supporting said weighing cage on said trailer bed, said spacer block having means to temporarily retain it in position during transportation.

7. The transportable livestock scale according to claim 1, wherein said draft attachment comprises a "goose-neck" arm and hitch, and further including a ramp adapted to be supported by one end from said trailer bed adjacent said gate during weighing, said trailer bed having means for stowing said ramp beneath the trailer bed during transportation.

8. The transportable livestock scale according to claim 1, wherein said extendable support legs are manually operated by cranks.

9. The transportable livestock scale according to claim 1, wherein said gate is horizontally slidable in a cage side member.

10. The transportable livestock scale according to claim 1, wherein said gate is a double gate with gate-halves hinged in a cage side member.

11. The transportable livestock scale according to claim 1, wherein said gate is vertically slidable in a cage side member.

12. The transportable livestock scale according to claim 1, wherein said weighing cage and said trailer bed are rectangular, wherein there are four load cells and four extendable support legs located on each corner.

13. A transportable livestock scale, comprising a rectangular trailer bed having wheels and having a draft attachment connected thereto for pulling the trailer bed,
- a plurality of load cells mounted on said trailer bed in spaced relationship, a weighing cage having a rectangular platform arranged to rest on said load cells and having cage side members together defining an enclosure for livestock to be weighed, said cage side members including at least one gate for entry or departure of livestock.
- a plurality of extendable support legs connected to said trailer bed and having means for extending said legs to unweight said wheels so as to at least partially support said trailer bed,
- load cell protective means comprising a plurality of spacer blocks each located adjacent a load cell for selectively unloading said load cell and selectively supporting said weighing cage directly from said trailer bed during transportation thereof, said spacer blocks having means for temporarily retaining them in place during transportation, and
- at least one ramp arranged to be stowed on said trailer bed in a first position during transportation thereof, said trailer bed having support brackets adapted to pivotably support one end of said ramp in a second position adjacent said gate when the extendable support legs are extended and when said weighing cage is resting on said load cells, whereby livestock may travel on said ramp through said gate into or out of said enclosure for weighing.

* * * * *